(12) United States Patent
Tomioka

(10) Patent No.: US 11,772,590 B2
(45) Date of Patent: Oct. 3, 2023

(54) WORK VEHICLE

(71) Applicant: ISEKI & CO., LTD., Ehime-ken (JP)

(72) Inventor: Eiji Tomioka, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 0 days.

(21) Appl. No.: 17/852,374

(22) Filed: Jun. 29, 2022

(65) Prior Publication Data

US 2023/0001874 A1 Jan. 5, 2023

(30) Foreign Application Priority Data

Jun. 30, 2021 (JP) ................................. 2021-109132

(51) Int. Cl.
*B60R 21/13* (2006.01)

(52) U.S. Cl.
CPC ......... *B60R 21/131* (2013.01); *B60Y 2200/22* (2013.01)

(58) Field of Classification Search
CPC ............ B60R 21/131; B60R 2021/137; B60Y 2200/22
See application file for complete search history.

(56) References Cited

U.S. PATENT DOCUMENTS

| | | | | |
|---|---|---|---|---|
| 2,785,002 A | * | 3/1957 | Schumaker | B60R 21/131 280/756 |
| 3,402,941 A | * | 9/1968 | Martinmaas | B60R 21/131 280/748 |
| 3,443,833 A | * | 5/1969 | Bucher | B60R 21/131 296/102 |
| 3,733,103 A | * | 5/1973 | Hansen | B60R 21/131 296/35.1 |
| 4,304,315 A | * | 12/1981 | Hirakawa | B62D 33/0617 180/54.1 |
| 2010/0187799 A1 | * | 7/2010 | Schmidt | B60R 21/131 280/756 |
| 2011/0233909 A1 | * | 9/2011 | Fukunaga | B60R 21/131 280/756 |
| 2013/0240283 A1 | * | 9/2013 | Spitz | B60K 15/063 180/291 |
| 2021/0402943 A1 | * | 12/2021 | Shoen | B60R 21/131 |

FOREIGN PATENT DOCUMENTS

JP 2004322723 11/2004

* cited by examiner

*Primary Examiner* — Frank B Vanaman
(74) *Attorney, Agent, or Firm* — JCIPRNET

(57) ABSTRACT

A work vehicle in which a safety frame can be easily attached and detached while costs are decreased. The work vehicle according to an embodiment includes: left and right rear axle cases; the safety frame which is attached to upper portions of the left and right rear axle cases and erected behind an operator seat and has an arch shape in a front view of a machine body; and a rear-side floor mount bracket that supports a rear portion of a floor step from below on left and right sides of the machine body. The rear-side floor mount bracket supports the floor step at a position that is different from attachment positions of the safety frame with respect to the left and right rear axle cases.

2 Claims, 5 Drawing Sheets

WORK VEHICLE

CROSS-REFERENCE

This application claims priority to Japanese Patent Application No. 2021-109132, filed Jun. 30, 2021, the disclosure of which is incorporated herein by reference in its entirety.

BACKGROUND

1. Field of the Disclosure

The present disclosure relates to a work vehicle.

2. Description of the Related Art

In the related art, a work vehicle such as an agricultural tractor includes a safety frame (also referred to as a ROPS), which is erected behind an operator seat and has an arch shape in a front view of a machine body, so that safety of an operator can be ensured when the vehicle overturns or the like. The safety frame is attached to a heavy component such as a rear wheel axle (for example, a rear axle case) by connecting members such as bolts (for example, see JP-A-2004-322723).

In a work vehicle, a mount portion of a rear-side floor mount bracket that supports a floor step from below may be attached to an attachment position of the safety frame together with the safety frame for the reason that the safety frame is desired to be attached to a rear axle case or the like which is a heavy component.

In addition, since the work vehicle needs to be packed when being transported, the safety frame may have a dividable structure with a height of a rear fender such that the safety frame does not protrude upward from a traveling vehicle body (for example, the rear fender).

However, for the work vehicle in the related art, the mount portion of the rear-side floor mount bracket is also attached to the attachment position of the safety frame during packing, and thus it is difficult to detach the safety frame, and costs increase when the safety frame has a dividable structure.

SUMMARY

The present disclosure provides a work vehicle according to an embodiment includes: left and right rear axle cases; a safety frame which is attached to upper portions of the left and right rear axle cases and erected behind an operator seat and has an arch shape in a front view of a machine body; and a rear-side floor mount bracket that supports a rear portion of a floor step from below on left and right sides of the machine body, in which the rear-side floor mount bracket supports the floor step at a position that is different from attachment positions of the safety frame with respect to the left and right rear axle cases.

DESCRIPTION OF THE PREFERRED EMBODIMENTS

Hereinafter, an embodiment of a work vehicle disclosed in the present application will be described in detail with reference to the accompanying drawings. However, the disclosure is not limited to the embodiment described below.

The disclosure provides a work vehicle in which a safety frame can be easily attached and detached while costs are decreased.

<Outline of Work Vehicle (Tractor)>

Figure 1:
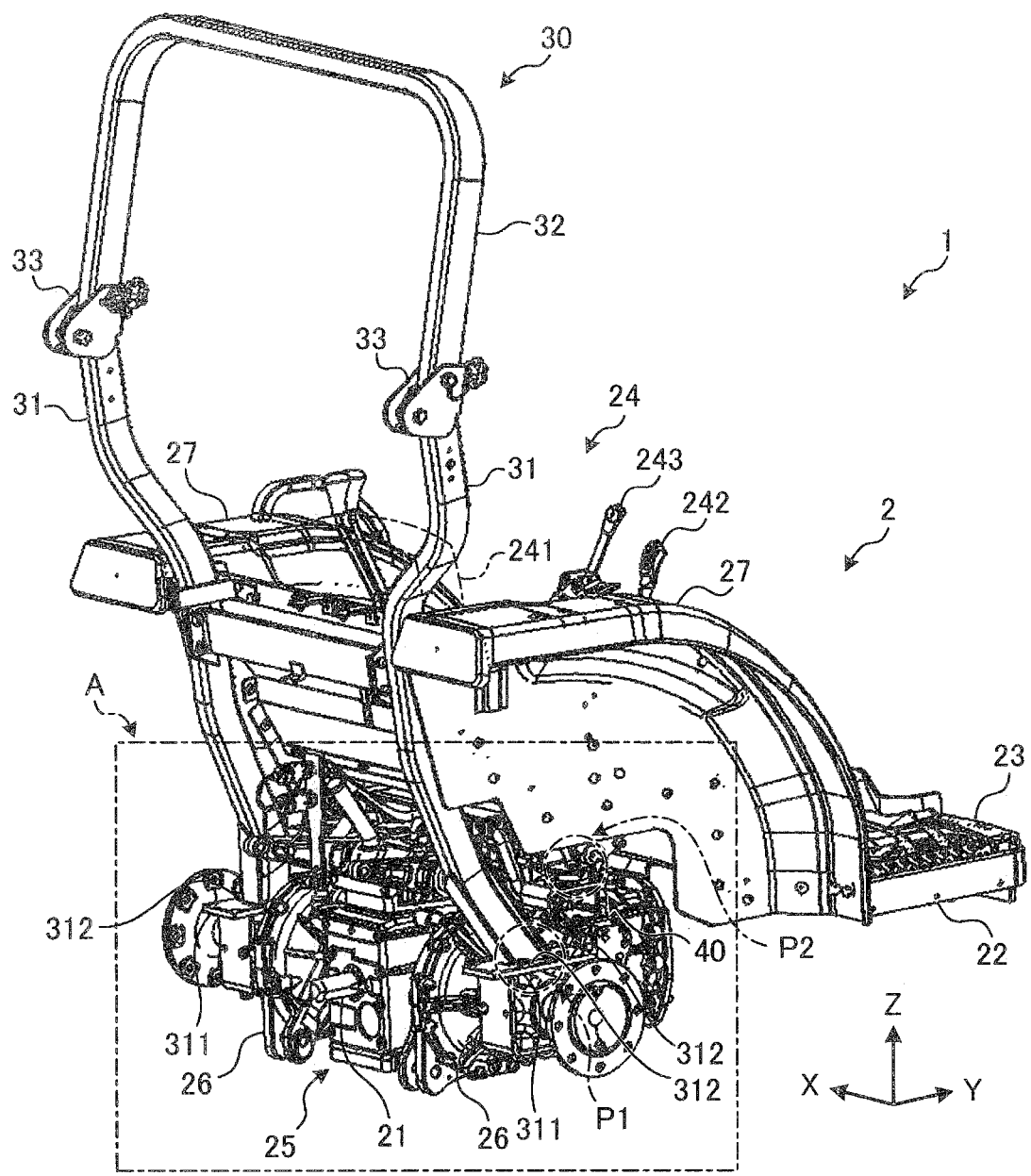
FIG. 1 is a perspective view showing a rear portion of a floor step and a support structure of a safety frame in a work vehicle according to an embodiment.
Figure 2:
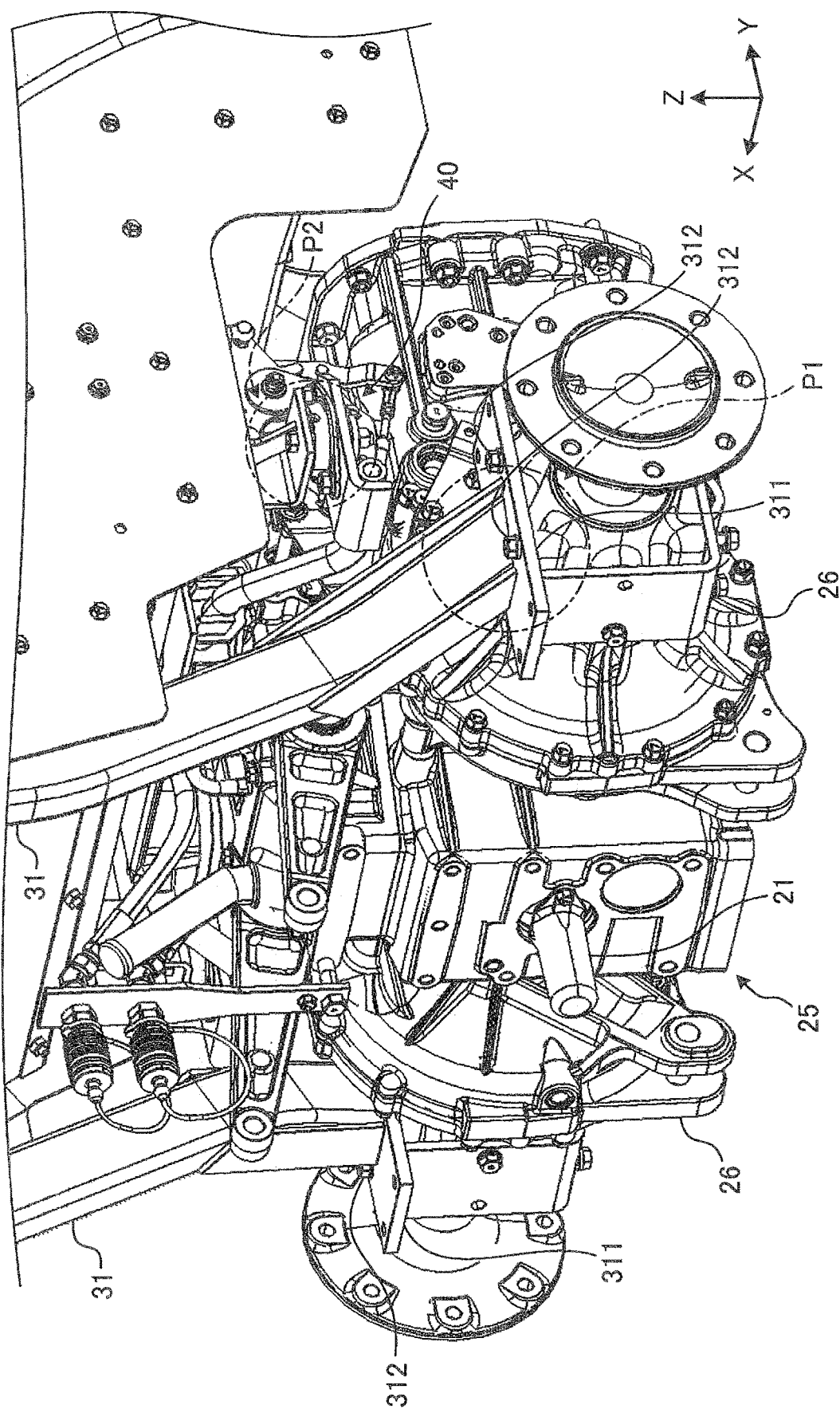
FIG. 2 is an enlarged view of a portion A in FIG. 1.

An outline of a work vehicle 1 according to an embodiment will be described with reference to FIGS. 1 and 2. FIG. 1 is a perspective view showing a rear portion of a floor step 23 and a support structure of a safety frame in the work vehicle (tractor) 1 according to the embodiment. FIG. 2 is an enlarged view of a portion A in FIG. 1.

In the drawings including FIGS. 1 and 2, a three-dimensional orthogonal coordinate system including a Z axis with a vertically upward direction (upper) as a positive direction is shown. Hereinafter, for convenience of description, for example, a positive direction of an X axis is defined as left, a negative direction of the X axis is defined as right, a positive direction of a Y axis is defined as front, and a negative direction of the Y axis is defined as rear; an X axis direction may be referred to as a left-right direction, a Y axis direction may be referred to as a front-rear direction, and a Z axis direction may be referred to as an up-down direction.

The work vehicle 1 according to the embodiment is, for example, an agricultural tractor (hereinafter, referred to as a tractor) that works in a farm field, and includes a traveling vehicle body 2 and a work machine (not shown) as shown in FIG. 1. The traveling vehicle body 2 is travelable in the farm field as a traveling device, and includes, for example, a pair of left and right front wheels (not shown) and a pair of left and right rear wheels (not shown). In this case, the front wheels are, for example, steering wheels, and the rear wheels are, for example, driving wheels. Hereinafter, a tractor 1 and the traveling vehicle body 2 may be referred to as a "machine body".

The rear wheels are configured such that power, which is generated in an engine (not shown) mounted inside a bonnet (not shown) forming a front portion of the traveling vehicle body 2, can be appropriately slowed down and transmitted in, for example, a main speed change device and an auxiliary speed change device (both not shown). That is, the rear wheels are driven by the power transmitted from the engine.

In addition, the tractor 1 may be configured such that four wheels including the left and right front wheels and the left and right rear wheels are driven by transmitting the power generated in the engine and slowed down by the main speed change device and the auxiliary speed change device to the front wheels as well via a front wheel acceleration switching mechanism (not shown). The tractor 1 may be configured to be switchable between two-wheel drive and four-wheel drive.

Further, a power take-off (PTO) shaft 21 on which the work machine can be mounted is disposed at a rear portion of the tractor 1. Examples of the work machine of the tractor 1 include a rotary cultivator attached to a rear portion of the traveling vehicle body 2. The rotary cultivator includes a cultivating claw that rotates by receiving power from the PTO shaft 21 and plows soil by the cultivating claw.

Further, the traveling vehicle body 2 includes a main cylinder (not shown) that is disposed at the rear portion of the traveling vehicle body 2 and applies a driving force to raise and lower the work machine. The main cylinder is connected to a lift arm (not shown) and applies a hydraulic driving force to the lift arm. The main cylinder is a hydraulic cylinder, and includes a cylinder case and a rod. The main cylinder drives the rod by being supplied with or discharging hydraulic oil.

When the hydraulic oil is supplied to the main cylinder, the main cylinder drives the lift arm via the rod to raise the work machine. When the hydraulic oil is discharged, the main cylinder drives the lift arm via the rod to lower the work machine.

As shown in FIG. 1, the traveling vehicle body 2 includes a main frame 22, the floor step 23, and an operation unit 24. The main frame 22 is a vehicle body frame of the traveling vehicle body 2. The floor step 23 covers a front-rear width from a front side beam frame to a rear side beam frame and a left-right width of a front side connecting frame and a rear side connecting frame on left and right sides in the main frame 22, and forms a portion on which an operator (also referred to as a worker) rides. The floor step 23 may be integrally formed to improve strength and reduce the number of components, or may be configured to be dividable in the front-rear direction or the left-right direction so as to be easily attached and detached.

A front portion (front side) and the rear portion (rear side) of the floor step 23 are supported on the main frame 22 from below. Therefore, the traveling vehicle body includes a front-side floor mount bracket (not shown) having mount portions for supporting the floor step 23, and a rear-side floor mount bracket 40. The rear-side floor mount bracket 40 will be described in detail later with reference to FIG. 3 and subsequent drawings.

The operation unit 24 is disposed above the floor step 23. The operation unit 24 includes an operator seat 241, a steering wheel (not shown), and other various operation members (a speed change lever 242, a position lever 243, a clutch pedal, a brake pedal, an accelerator pedal, and the like). The operator seat 241 is a seat on which the operator of the machine body sits. The steering wheel is an operation member that steers the front wheels. A meter panel or the like is disposed in front of the steering wheel.

The speed change lever 242 is an operation member that is operated when changing a speed of the traveling vehicle body 2, and the position lever 243 is an operation member that is operated when raising and lowering the work machine, and is an operation member that is operated when raising and lowering the work machine while adjusting a raising and lowering speed of the work machine.

In addition, the tractor 1 is a type that does not include a cabin or the like that covers the operation unit 24, and thus includes the safety frame 30 as shown in FIGS. 1 and 2. The safety frame 30 is a member provided to ensure safety of the operator, and is a member that is erected behind the operator seat 241 and has an arch shape in a front view of the machine body (when viewed from front of the machine body).

The safety frame 30 includes lower frames 31, an upper frame 32, and connecting portions 33. The lower frames 31 are a pair of left and right lower frames, which are attached to upper portions of left and right rear axle cases 26 provided integrally with respect to a rear transmission case on both left and right side portions of the rear transmission case 25, respectively. The upper frame 32 is provided so as to be suspended between upper end portions of the left and right lower frames 31.

The connecting portions 33 are disposed between the upper frame 32 and the left and right lower frames 31, and connect the upper frame 32 with the left and right lower frames 31. The connecting portions 33 connect the left and right lower frames 31 with the upper frame 32 such that the upper frame 32 is rotatable with respect to the left and right lower frames 31. The upper frame 32 is connected to the left and right lower frames 31 by the connecting portions 33 so as to be tiltable rearward. A damper (not shown) is provided in the connecting portion 33. The damper is, for example, a gas spring type, includes a cylinder and a rod inserted into the cylinder, and is configured to be stretchable.

In this manner, a position of the upper frame 32 of the safety frame 30 can be changed from a standing position to a tilted position (storage position).

The left and right lower frames 31 are attached to the left and right rear axle cases 26 by support members 311 interposed between the left and right lower frames 31 and the rear axle cases 26 and connecting members 312 such as bolts. The left and right lower frames 31 can be detached from the left and right rear axle cases 26 by removing the connecting members 312.

In the tractor 1, attachment positions P1 of the safety frame 30 with respect to the left and right rear axle cases 26 and positions (support position) P2 at which the rear-side floor mount bracket 40 supports the floor step 23 are disposed to be different from each other.

<Rear-side Floor Mount Bracket>

Figure 3:
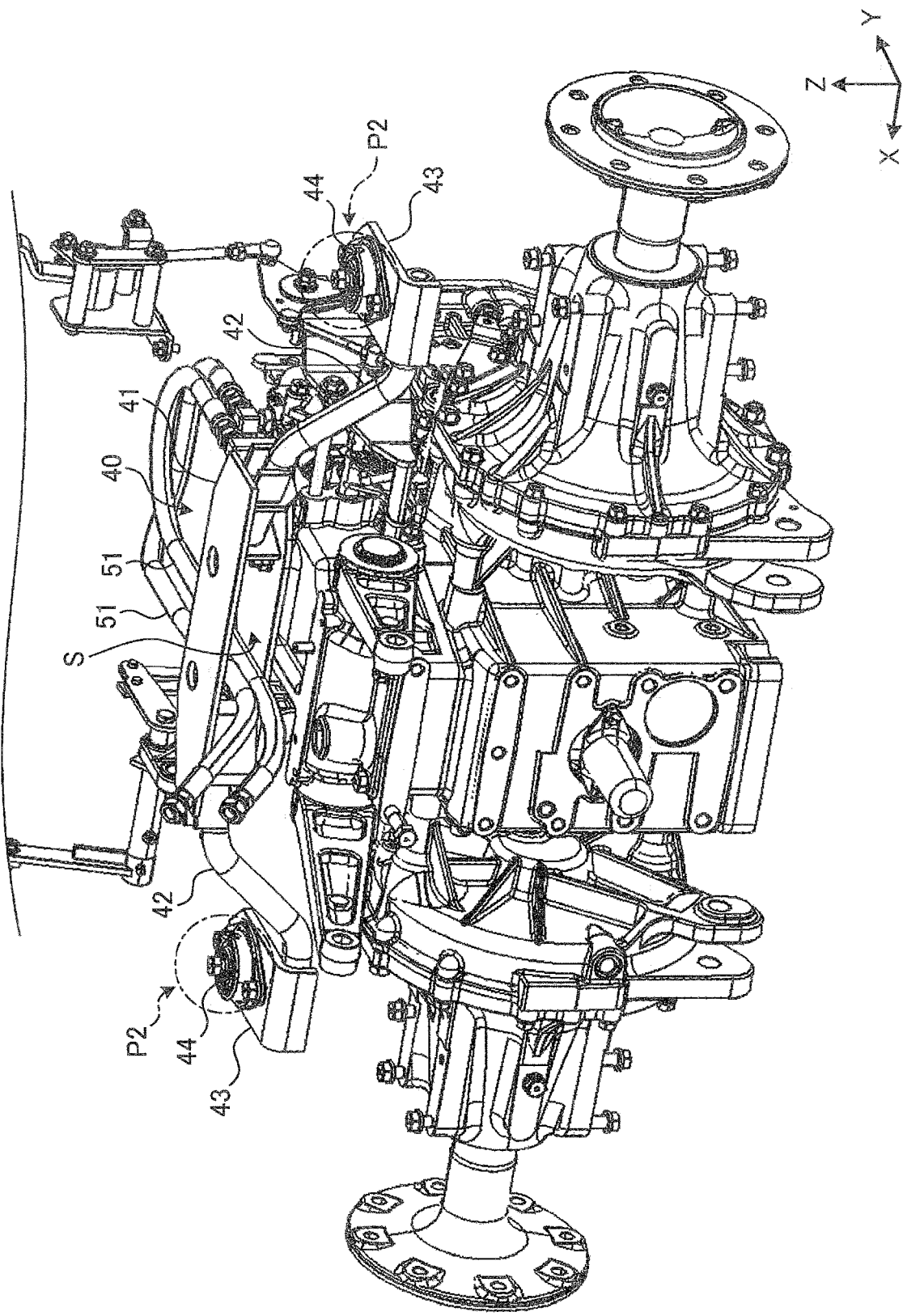
FIG. 3 is an enlarged perspective view showing a state in which the floor step is supported by a rear-side floor mount bracket.
Figure 4A:
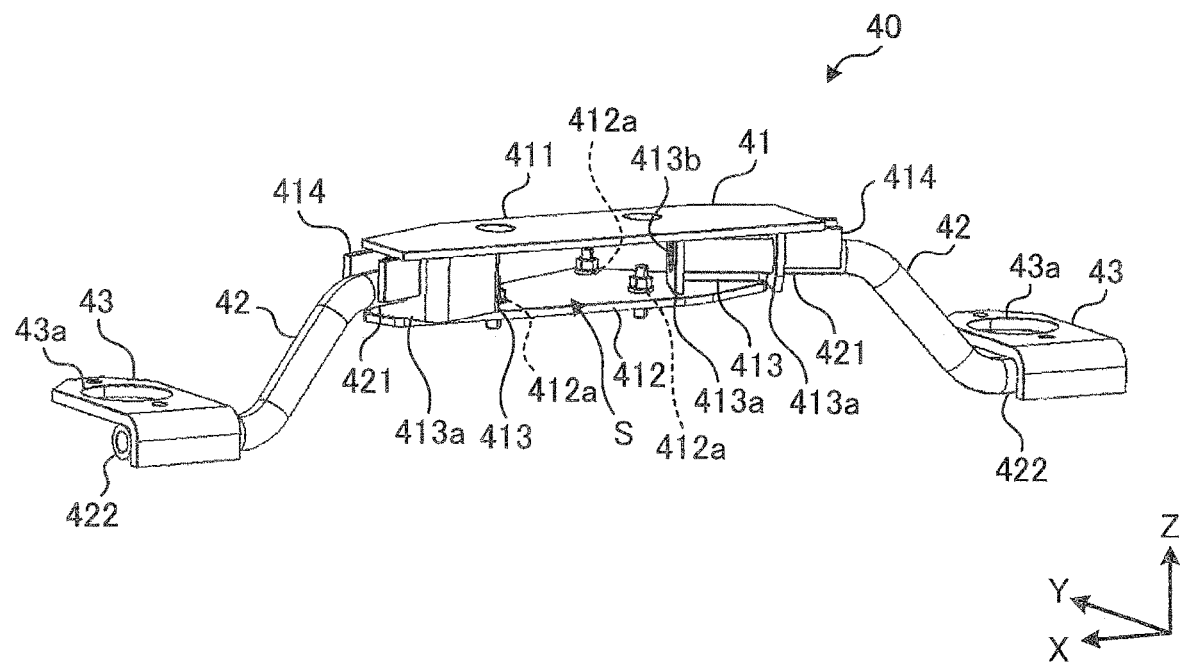
FIG. 4A is a perspective view showing the rear-side floor mount bracket.
Figure 4B:
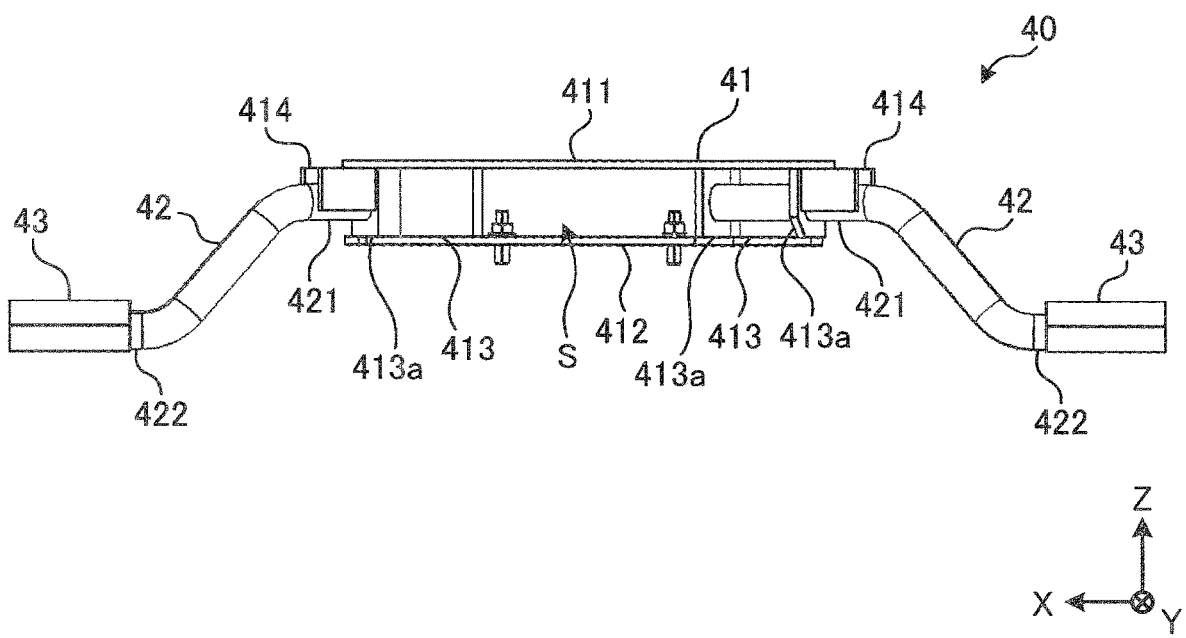
FIG. 4B is a rear view showing the rear-side floor mount bracket.

Next, the Rear-Side Floor Mount Bracket 40 Will be described with reference to FIGS. 3, 4A, and 4B. FIG. 3 is an enlarged perspective view showing a state in which the floor step 23 is supported by the rear-side floor mount bracket 40. FIG. 4A is a perspective view showing the rear-side floor mount bracket 40. FIG. 4B is a rear view showing the rear-side floor mount bracket 40.

As shown in FIG. 3, the rear-side floor mount bracket 40 supports the floor step 23 (see FIG. 1) from below via mount members (for example, rubber mounts having an anti-vibration function) 44, which are disposed on mount portions 43 as described later and are disposed on both left and right side portions of the machine body.

As shown in FIGS. 4A and 4B, the rear-side floor mount bracket 40 includes a bracket fixing portion 41, stay portions 42, and the mount portions 43. The bracket fixing portion 41 is attached to an upper portion (an upper surface of the cylinder case) of the main cylinder, which is disposed at the rear portion of the traveling vehicle body 2 (see FIG. 1) and configured to raise and lower the work machine.

The bracket fixing portion 41 includes a top plate 411, a bottom plate 412, and side plate portions 413. The top plate 411 is a horizontally long plate-shaped member, that is, a plate-shaped member that extends in the left-right direction in an installed state of the rear-side floor mount bracket 40. The bottom plate 412 is a horizontally long plate-shaped member, that is, a plate-shaped member that extends in the left-right direction in the installed state of the rear-side floor mount bracket 40. The bottom plate 412 has a plurality of (three) fixing holes 412a for fixing the bottom plate 412 to the upper surface of the cylinder case when the rear-side floor mount bracket 40 is installed.

The rear-side floor mount bracket 40 is fixed to the upper surface of the cylinder case by using fixing members such as bolts via the fixing holes 412a of the bottom plate 412. For example, two of the three fixing holes 412a are disposed side by side in the left-right direction at a rear end edge portion of the bottom plate 412, and one of the three fixing holes 412a is disposed at a front end edge portion of the bottom plate 412. The fixing hole 412a disposed at the front end edge portion of the bottom plate 412 is, for example, offset to a right side.

The side plate portions 413 are plate-shaped members formed in a U shape, and are respectively disposed on left and right side portions of the top plate 411 and the bottom plate 412. The side plate portions 413 are disposed such that two side plates 413a are disposed side by side at a predetermined interval on both left and right side portions of the top plate 411 and the bottom plate 412. The side plate portions 413 connect the top plate 411 with the bottom plate 412.

In addition, the bracket fixing portion 41 has an internal space S formed by the top plate 411, the bottom plate 412, and inner sides of the side plates 413a so as to penetrate in the front-rear direction in the installed state of the rear-side floor mount bracket 40. As shown in FIG. 3, hydraulic hoses 51 forming an oil passage in a hydraulic system of the machine body are inserted into the internal space S in the installed state of the rear-side floor mount bracket 40. In addition, various sub-hoses and the like are inserted into the internal space S for routing in the installed state of the rear-side floor mount bracket 40.

As shown in FIGS. 4A and 4B, the bracket fixing portion 41 includes holder members 414 for holding the stay portions 42 to be described later. The holder members 414 are plate-shaped members formed in a U shape and are disposed on both left and right side portions of the bracket fixing portion 41.

The stay portions 42 are a pair of left and right stay portions and extend from both left and right side portions of the bracket fixing portion 41 to left and right sides, respectively. The left and right stay portions 42 are pipe-shaped members. Base end portions 421 of the left and right stay portions 42 are fixed by the side plate portions 413 of the bracket fixing portion 41, and the left and right stay portions 42 are inclined downward from the bracket fixing portion 41 toward tip end portions 422, respectively. The left and right stay portions 42 are formed so as to have an inverted V-shape in a rear view of the machine body in the installed state of the rear-side floor mount bracket 40. The left and right stay portions 42 are also formed to have an inverted V-shape in a top view of the machine body in the installed state of the rear-side floor mount bracket 40.

The base end portions 421 of the left and right stay portions 42 are inserted into insertion holes 413b formed in the side plates 413a of the bracket fixing portion 41 and are sandwiched by the side plates 413a, and are further fixed to the bracket fixing portion 41 by welding or the like in a state of being sandwiched and held by the holder members 414. In addition, the U-shaped side plate portions 413 of the bracket fixing portion 41 are disposed in opposite directions to each other such that opening portions are opposite to each other on left and right sides, and the U-shaped side plate portions 413 are welded or the like, and thus it is possible to ensure clearance with surrounding components.

The mount portions 43 are plate-shaped members formed in an L shape and are provided at the tip end portions 422 of the left and right stay portions 42, respectively. The mount portions 43 are fixed to the left and right stay portions 42 by welding or the like. The mount portion 43 each has an attachment hole 43a to which the mount member (see FIG. 3) such as a rubber mount is attached. The mount portions 43 support the floor step 23 (see FIG. 1) from below via the mount members 44.

As described above, the support positions P2 (see FIG. 1) of the floor step 23 supported by the mount portions 43 are positions that are different from the attachment positions P1 (see FIG. 1) of the safety frame 30, and specifically, the support positions P2 are disposed above the attachment positions P1 of the safety frame 30 and in front of the attachment positions P1 of the safety frame 30. The attachment positions P1 of the safety frame 30 are disposed below the support positions P2 of the floor step 23 and behind the support positions P2 of the floor step 23.

In this manner, the attachment positions P1 of the safety frame 30 and the support positions P2 of the floor step 23 are different positions, and thus the safety frame 30 can be attached to or detached from the rear axle cases 26 alone. Accordingly, the safety frame 30 can be easily attached and detached.

When the tractor 1 (see FIG. 1) is transported, it is necessary to pack the tractor 1. However, for example, when the safety frame 30 protrudes upward from rear fenders 27 of the traveling vehicle body 2, it is difficult to pack the tractor 1. Therefore, although the safety frame 30 may have a dividable structure with a height of the rear fenders (see FIG. 1), since the safety frame 30 can be easily detached from the attachment positions P1 of the rear axle cases 26, such a dividable structure is unnecessary while costs are decreased.

The attachment positions P1 of the safety frame 30 are disposed below the mount portions 43, so that work of attaching and detaching the safety frame 30 can be performed at a low position, and the work of attaching and detaching the safety frame 30 is easier.

The safety frame 30 is supported below the traveling vehicle body 2 (see FIG. 1), so that a center of gravity of the machine body is lowered, and it is possible to prevent a decrease in balance performance of the machine body.

The left and right stay portions 42 are inclined downward toward the tip end portions 422, so that the mount portions 43 can be disposed further downward and the floor step 23 can be disposed further downward.

Since the bracket fixing portion 41 has the internal space S, by inserting the hydraulic hoses 51 and the like into the internal space S, a plurality of hydraulic hoses 51, various sub-hoses, and the like can be collected, and the hydraulic hoses 51, various sub-hoses, and the like can be easily routed.

The left and right stay portions 42 are pipe-shaped members, and thus vibration of the floor step 23 can be absorbed by the left and right stay portions 42 together with the mount members 44.

<Positional Relationship Between Rear-Side Floor Mount Bracket and Each Part>

Figure 5A:
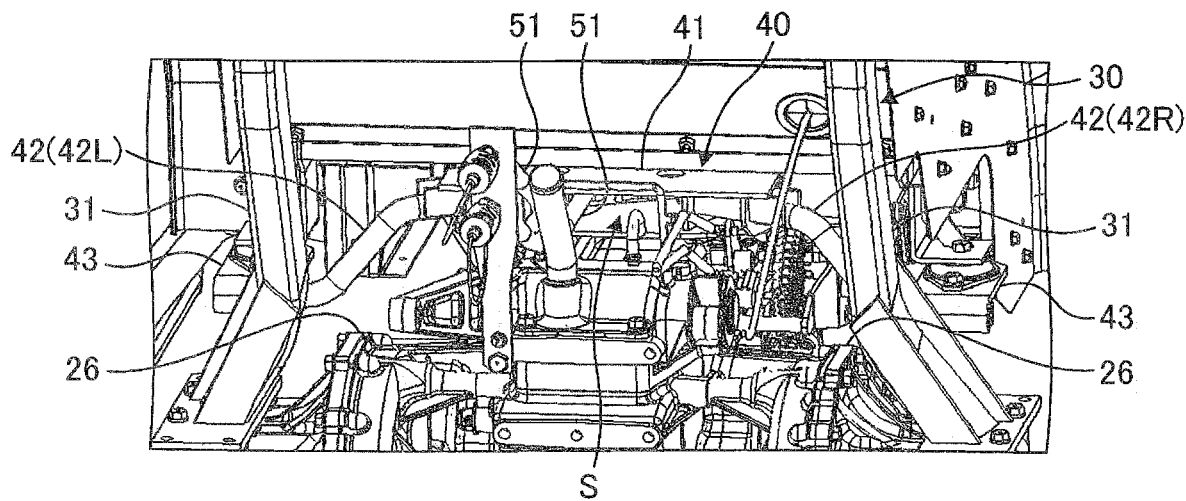
FIG. 5A is a view (1) showing a positional relationship between the rear-side floor mount bracket and each part.
Figure 5B:
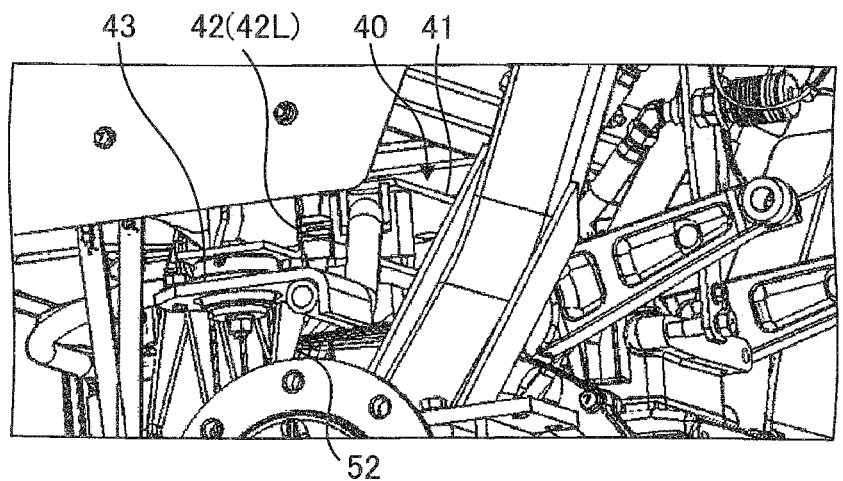
FIG. 5B is a view (2) showing a positional relationship between the rear-side floor mount bracket and each part.
Figure 5C:
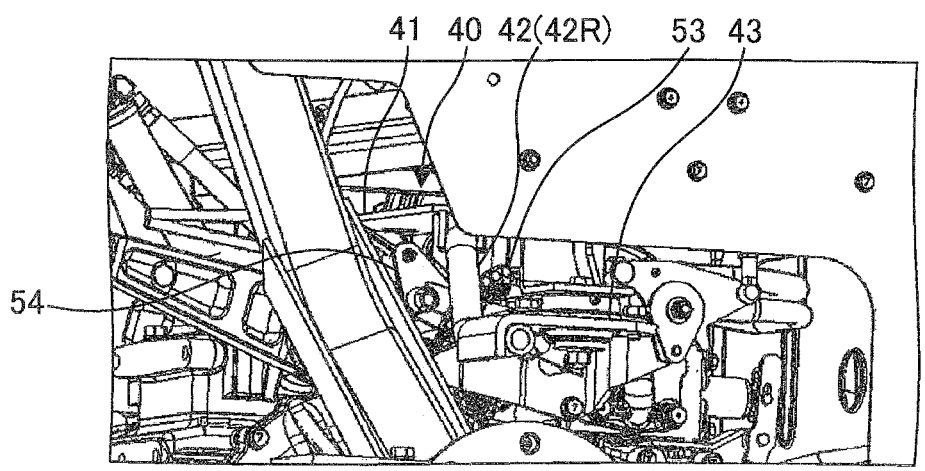
FIG. 5C is a view (3) showing a positional relationship between the rear-side floor mount bracket and each part.

Next, a positional relationship between the rear-side floor mount bracket 40 and each part will be described with reference to FIGS. 5A, 5B, and 5C. FIGS. 5A to 5C are views (perspective views) showing the positional relationship between the rear-side floor mount bracket 40 and each part.

As shown in FIG. 5A, the hydraulic hoses 51, various sub-hoses, and the like are inserted into the internal space S of the bracket fixing portion 41 in the installed state of the rear-side floor mount bracket 40 as described above. The left and right stay portions 42 (a left stay portion 42L and a right stay portion 42R) pass above the rear axle cases 26. The left and right stay portions 42 (the left stay portion 42L and the right stay portion 42R) pass in front of the lower frames 31 of the safety frame 30.

As shown in FIG. 5B, in the installed state of the rear-side floor mount bracket 40, the left stay portion 42L of the left and right stay portions 42 passes behind a change bracket 52 that supports a link connected to the speed change lever (also referred to as a change lever) 242 (see FIG. 1) so as to be able to transmit power.

As shown in FIG. 5C, in the installed state of the rear-side floor mount bracket 40, the right stay portion 42R of the left and right stay portions 42 passes above a position link 53 connected to the position lever 243 (see FIG. 1) so as to be able to transmit power. The right stay portion 42R passes above a draft link 54 for pulling the work machine. The right stay portion 42R passes between the position link 53 and the draft link 54. The draft link 54 is disposed below the holder members 414 of the bracket fixing portion 41 so as to be protected by the holder members 414.

In addition, in the installed state of the rear side floor mount bracket 40, the left and right stay portions 42 (the left stay portion 42L and the right stay portion 42R) are disposed obliquely in front of the lift arm (not shown) that raises and lowers the work machine in the tractor 1 (see FIG. 1).

According to the embodiment described above, the work vehicle (tractor) 1 is implemented as follows.

(1) The work vehicle (tractor) 1 includes: the left and right rear axle cases 26; the safety frame 30 which is attached to upper portions of the left and right rear axle cases 26 and erected behind the operator seat 241 and has an arch shape in a front view of a machine body; and the rear-side floor mount bracket 40 that supports a rear portion of the floor step 23 from below on left and right sides of the machine body, in which the rear-side floor mount bracket 40 supports the floor step 23 at positions (support positions P2) that is different from the attachment positions P1 of the safety frame 30 with respect to the left and right rear axle cases 26.

According to such a work vehicle (tractor) 1, the attachment positions P1 of the safety frame 30 and the positions (support positions) P2 where the floor step 23 is supported are different positions, and thus the safety frame 30 can be attached to or detached from the rear axle cases 26 alone. Accordingly, the safety frame 30 can be easily attached and detached.

When the work vehicle (tractor) 1 is transported, it is necessary to pack the work vehicle (tractor) 1. However, for example, when the safety frame 30 protrudes upward from the rear fenders 27 of the traveling vehicle body 2, it is difficult to pack the work vehicle (tractor) 1. Therefore, although the safety frame 30 may have a dividable structure with a height of the rear fenders 27, since the safety frame 30 can be easily detached from the attachment positions P1 with respect to the rear axle cases 26, such a dividable structure is unnecessary while costs are decreased.

(2) In the work vehicle (tractor) 1 as described above in (1), the rear-side floor mount bracket 40 includes the bracket fixing portion 41, the left and right stay portions 42 extending from the bracket fixing portion 41 to left and right sides, and the mount portions 43 provided at corresponding tip end portions of the left and right stay portions 42 and supporting the floor step 23, and the attachment positions P1 of the safety frame 30 with respect to the rear axle cases 26 are disposed below the mount portions 43.

According to such a work vehicle (tractor) 1, since the attachment positions P1 of the safety frame 30 with respect to the rear axle cases 26 are disposed below the mount portions 43, work of attaching and detaching the safety frame 30 can be performed at a low position, and the work of attaching and detaching the safety frame 30 is easier.

Further, the safety frame 30 is supported below the traveling vehicle body 2, so that a center of gravity of the machine body is lowered, and it is possible to prevent a decrease in balance performance of the machine body.

(3) In the work vehicle (tractor) 1 as described above in (2), the left and right stay portions 42 are inclined downward from the bracket fixing portion 41 toward the tip end portions, respectively.

According to such a work vehicle (tractor) 1, the mount portions 43 can be disposed further downward and the floor step 23 can be disposed further downward.

(4) In the work vehicle (tractor) 1 as described above in (2) or (3), the bracket fixing portion 41 has the internal space S that penetrates in the front-rear direction, and the hydraulic hoses 51 forming an oil passage in a hydraulic system of the machine body are inserted into the internal space S.

According to such a work vehicle (tractor) 1, by inserting the hydraulic hoses 51 into the internal space S of the bracket fixing portion 41, a plurality of hydraulic hoses 51 can be collected and the hydraulic hoses 51 can be easily routed.

What is claimed is:

1. A work vehicle comprising:
left and right rear axle cases;
a safety frame which is attached to upper portions of the left and right rear axle cases and erected behind an operator seat and has an arch shape in a front view of a machine body; and
a rear-side floor mount bracket that supports a rear portion of a floor step from below on left and right sides of the machine body,
wherein
the rear-side floor mount bracket supports the floor step at a position that is different from attachment positions of the safety frame with respect to the left and right rear axle cases,
the rear-side floor mount bracket includes a bracket fixing portion, left and right stay portions extending from the bracket fixing portion to left and right sides, and mount portions provided at corresponding tip end portions of the left and right stay portions and supporting the floor step,
the attachment positions of the safety frame with respect to the rear axle cases are disposed below the mount portions, and
the left and right stay portions are inclined downward from the bracket fixing portion toward the tip end portions, respectively.

2. The work vehicle according to claim 1, wherein the bracket fixing portion has an internal space that penetrates in a front-rear direction, and a hydraulic hose forming an oil passage in a hydraulic system of the machine body is inserted into the internal space.

* * * * *